Oct. 26, 1948.　　　G. W. SCHIVLEY ET AL　　　2,452,073
FOLDED DIPOLE

Filed Nov. 17, 1944　　　　　　　　　　　　2 Sheets-Sheet 1

INVENTOR.
PAUL W. SPRINGER
GEORGE W. SCHIVLEY
BY William D Hall,
ATTORNEY

Oct. 26, 1948.    G. W. SCHIVLEY ET AL    2,452,073
FOLDED DIPOLE
Filed Nov. 17, 1944    2 Sheets-Sheet 2

INVENTOR.
PAUL W. SPRINGER
GEORGE W. SCHIVLEY
BY William D. Hall.
ATTORNEY

Patented Oct. 26, 1948

2,452,073

UNITED STATES PATENT OFFICE 2,452,073

FOLDED DIPOLE

George William Schivley, Buchtel, and
Paul W. Springer, Dayton, Ohio

Application November 17, 1944, Serial No. 563,980

1 Claim. (Cl. 250—33.65)

(Granted under the act of March 3, 1883, as
amended April 30, 1928; 370 O. G. 757)

The invention described herein may be manufactured and used by or for the Government for governmental purposes, without the payment to us of any royalty thereon.

The present invention relates to directional antennae.

An object of the invention is to provide a radio antenna for use on the tail of an aircraft in circuit with a warning device, to warn of the presence of another craft in flight within a predetermined range.

A further object is to provide such an antenna which may be applied to various types and sizes of aircraft with a minimum of adjustment.

A further object is to provide such an antenna which is of light weight, highly directional, of controllable wave pattern and range, simple to manufacture and install and highly efficient in use.

These and other objects will appear throughout the specification and will be pointed out in the claim.

The use of reflected radio wave pulse transmitting and receiving instruments to signal the presence of distant objects is particularly indicated for use in warning a pilot in flight, particularly a fighter plane pilot, of the presence of an enemy plane just outside firing range directly behind the tail of his plane.

The difficulties of adapting such radio equipment, however, have centered about the control of the emitted and received radio waves so that only reflected waves from planes within the vulnerable area behind the tail and within firing range be indicated. If such warning equipment were actuated by neighboring flight formations, ground signal, or planes beyond firing range, it would inevitably endanger and confuse the pilot.

The use of a unidirectional antenna would aid in the direction of the transmitted waves to the rear of the plane. Available antennae, particularly the Yagi type, when applied to the tail fin of a plane, have the disadvantage of requiring individual tuning for every plane since the thickness of the fins on different aircraft on which the antenna is to be mounted, is subject to considerable variation. The necessity for weight reduction of this auxiliary equipment also limits the usefulness of such antenna because of its low efficiency when bilaterally shrouded.

The present invention utilizes a quarterwave two-section unidirectional dipole antenna of the folded type, one section of which is attached to each side of the airplane vertical fin. These two antenna sections are electrically joined together by a looped phasing and balancing cable section so that regardless of the spacing between the two sections, any variation in width of fins is automatically taken up by the slack in the loop without in any way affecting the balancing or tuning of the antenna-transmitter-receiver circuit. By such a laterally adjustable construction, the entire problem of antenna installation to various types and sizes of aircraft becomes so simple that installation may be easily accomplished by inexperienced persons unfamiliar with radio circuit balancing or slotted line technique. Once the size of antenna is established by the manufacturer, in balance with the transmitter and receiver, variation in width of tail fin will not affect the range, direction or pattern of the radiated waves, as is the case with rigid Yagi type antennae, in which covering or uncovering of the projecting antenna by the fin surface would change the length and consequently the characteristics of the antenna.

Referring to the drawings wherein like numerals denote like parts,

Figure 1:
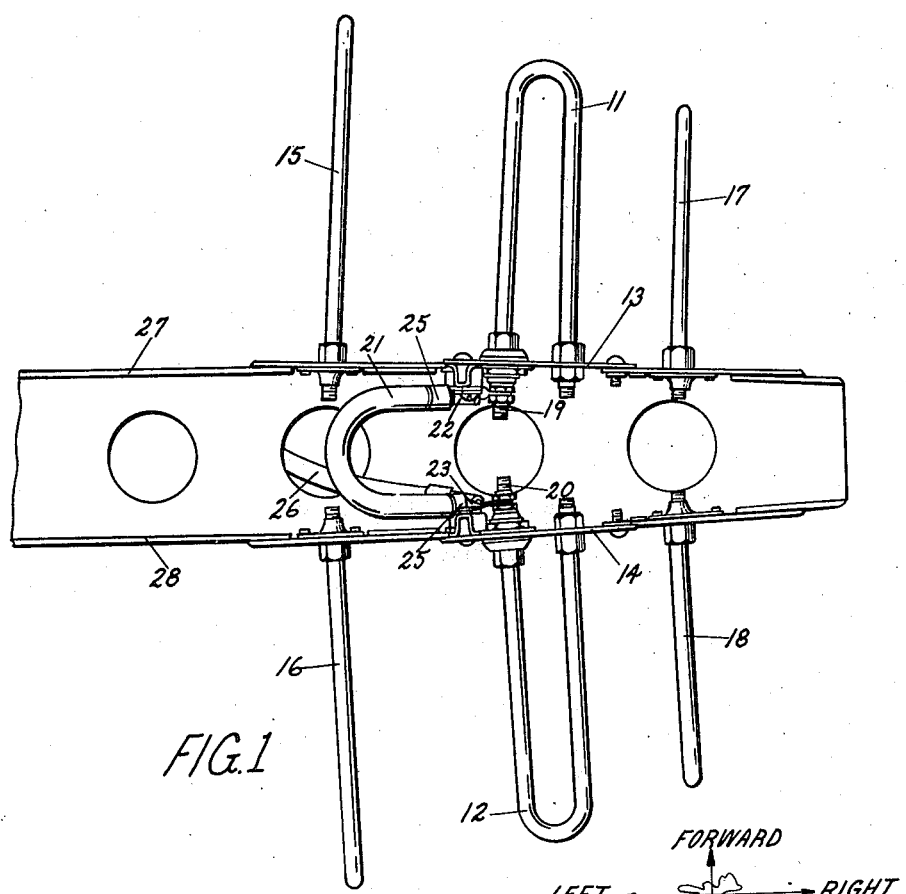
Fig. 1 is a top plan view of the antenna in location with respect to its parasitic reflector, and director.
Figure 5:
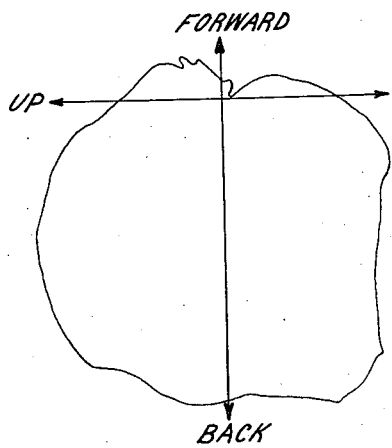
Fig. 5 is a vertical cross-section of the wave pattern horizontally sectioned in Fig. 4.
Figure 4:
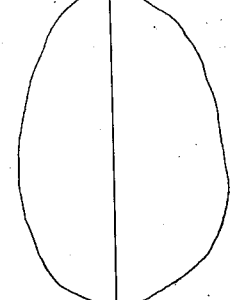
Fig. 4 is a cross-sectional illustration of the horizontal field or wave pattern obtainable with the antenna herein described.
Figure 3:
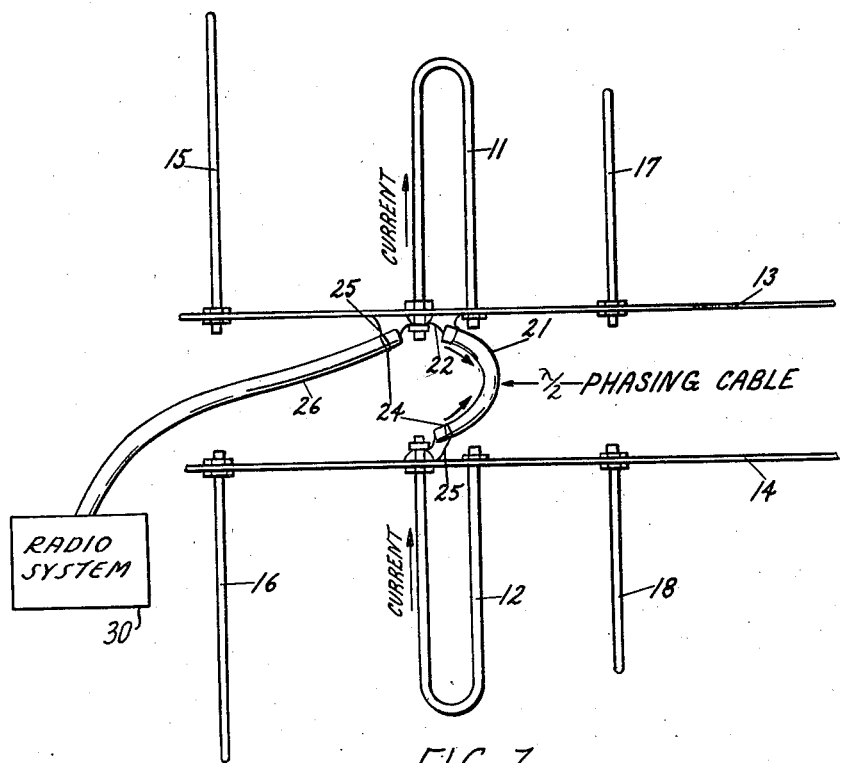
Fig. 3 is an enlarged schematic diagram of the antenna shown in Fig. 2, illustrating the circuit connections.
Figure 2:
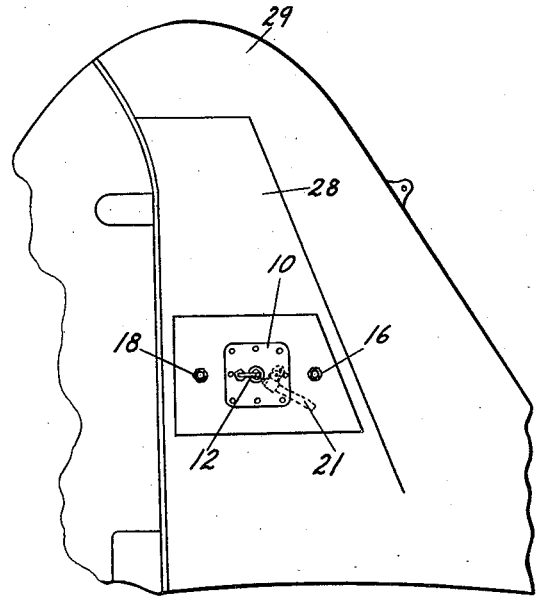
Fig. 2 is a side elevation on a reduced scale of the antenna shown in Fig. 1, illustrating the normal relationship of antenna and aircraft tail fin.

By way of illustration, the preferred embodiment of the invention, as applied to an aircraft tail fin or wing comprises a folded dipole two-section antenna, generally referred to as 10 and composed of two U-shaped rods 11 and 12 threaded at their ends for bolting to a pair of assembly plates 13 and 14. Bolted to these plates 13 and 14 in the plane of the legs of the U-shaped antenna 11 and 12 and spaced therefrom a pair of parasitic reflector rods 15 and 16 project outwardly parallel with the U-shaped antenna leg sections 11 and 12 and for a greater distance. Parallel with and also in the plane of said antenna sections 11 and 12, a pair of director rods 17 and 18 extend from said assembly plates for a distance less than that of either the parasitic reflectors or the antenna sections. Looped between and electrically connecting one of the adjacent ends 19 and 20 of each of the antenna sections 11 and 12 is a cable 21. This cable is of the coaxial type so that the core conductor 22 may be used to connect the insulated antenna ends 19 and 20 by connectors 23 and the outer conductor 24 may be electrically connected to the grounded assembly plates 13 and 14 by connectors 25. Cable 21 is made an odd multiple of one-half the wave length used in transmission and reception over the antenna. This length of cable has the effect of dividing the current from conductor 26 equally between antennae 11 and 12 and of making the currents in these two antennae equal and in constant, or like, phase in the sense indicated by the arrows in Figure 3. Another length of this coaxial conductor 26 connects the antenna and assembly plates with a radio transmitter and receiver system 30.

Thus it is apparent that the assembly plates 13 and 14 may be positioned closely together or widely separated to the full extent of the looped cable, to comply with the tail fin's thickness. By such an arrangement, it has been found that the field pattern of radiation and characteristic impedance is not affected by separation of the two sections of antenna 11 and 12 by the aircraft's tail fin. For the high frequencies that are herein contemplated the extent of the metallic surface of the fin is so great as to constitute a complete shield between the two sections of the antenna. There is thus no coupling and no reaction between the two sections other than through cable 21. Thus there is no change in their reaction or impedance when their separation is changed by placing them on fins of different thicknesses.

In use, the assembly plate 13, with antenna section 11 bolted thereto between reflector 15 and director 17 is fastened to one face 27 of the aircraft's tail fin. Plate 14 with antenna section 12, reflector 16, and director 18 similarly appended, is secured to the opposite face 28 of the aircraft's tail fin 29. The fin faces, 27 and 28 having been suitably perforated so as not to interfere with the inwardly projecting threaded ends of antenna, reflector and director rods, the assembly plates 13 and 14 when riveted or screwed to their respective faces 27 and 28 are aligned so that mating sections of antenna, reflector and director extend substantially in the same plane in opposite directions and perpendicularly to the plane of the fin 29. When so arrayed and in circuit with a pulse transmitter and receiver through coaxial cable 26, the resultant quarterwave radiated field or coverage is substantially that of a cone of 90 degrees in vertical, 60 degrees horizontal at half power with apex at the tail fin, the center line of the cone angle extending parallel with the axis of the aircraft. By suitably spacing and balancing the size of the array the impedance of the array can be made to match that of any standard coaxial line. The pattern shape can be governed to some extent by suitably spacing the elements. The characteristic pattern of the radiated and reflected waves will remain constant regardless of the space separation (within practical limits) between the opposite faces of the tail fin (and consequently of the antenna sections) which is spanned by the coaxial cable loop 21.

With associated radar equipment the invention has been found highly useful in warning of the presence of enemy aircraft behind the tail of the plane on which the apparatus has been installed. It is obvious that by a suitable wing mounting forward gun range radar may be had. Any radar type transmitting and receiving apparatus within frequency limits may be used with the antenna, so that not only the presence, but also the range of other aircraft may be indicated. In conjunction with suitable associated radar equipment the same antenna may be used to both transmit the pulsed wave and receive the reflected wave.

While the invention has been described in its preferred embodiment, it is contemplated that changes in the details thereof may be made within the spirit and scope of the invention as claimed.

What is claimed is:

The combination in a two-section folded dipole directional radio antenna provided with wave reflector and director elements for transmission and reception of pulsed radio waves, of adjustable means for adapting said antenna for use on variable width mountings, said means comprising a pair of demountable assembly plates having mounted thereon mating sections of said antenna, reflector and director elements, and a length of coaxial multiple conductor cable looped and electrically connecting said plates and antenna sections so as to allow variable interspaced juxtaposed mounting of said plates while maintaining constant phase characteristics of said antenna.

GEORGE WILLIAM SCHIVLEY.
PAUL W. SPRINGER.

REFERENCES CITED

The following references are of record in the file of this patent:

UNITED STATES PATENTS

| Number | Name | Date |
|---|---|---|
| 1,745,324 | Yagi | Jan. 28, 1930 |
| 2,110,278 | Shaw | Mar. 8, 1932 |
| 1,942,594 | Edwards et al. | Jan. 9, 1934 |
| 2,216,708 | Kolster | Oct. 1, 1940 |
| 2,199,050 | Jenkins | Apr. 30, 1940 |
| 2,235,015 | Eggers | Mar. 18, 1941 |
| 2,243,136 | Trevor | May 27, 1941 |
| 2,258,407 | Carter | Oct. 7, 1941 |
| 2,292,791 | Mims | Aug. 11, 1942 |

FOREIGN PATENTS

| Number | Country | Date |
|---|---|---|
| 399,543 | Great Britain | Oct. 9, 1933 |
| 424,747 | Great Britain | Feb. 27, 1935 |

OTHER REFERENCES

Carter, "Simple Television Antennas," Radio at Ultra-High Frequencies, RCA Institutes Technical Press, April 1940, pp 10–12. (Copy in Div. 51.)